(12) United States Patent
Maul et al.

(10) Patent No.: US 10,502,553 B2
(45) Date of Patent: Dec. 10, 2019

(54) WELDABLE STRAIN SENSOR FOR CURVED SURFACES

(71) Applicant: Hottinger Baldwin Messtechnik GmbH, Darmstadt (DE)

(72) Inventors: Jochen Maul, Mainz (DE); Tobias Kipp, Darmstadt (DE); Bernd Günther, Karlsruhe (DE); Maria Marta Cabral Bobiâo Girâo, Leça do Balio (PT); Francisco Manuel Moita Araûjo, Matosinhos (PT)

(73) Assignee: HOTTINGER BALDWIN MESSTECHNIK GMBH, Darmstadt (DE)

( * ) Notice: Subject to any disclaimer, the term of this patent is extended or adjusted under 35 U.S.C. 154(b) by 0 days.

(21) Appl. No.: 16/336,434

(22) PCT Filed: Jul. 24, 2017

(86) PCT No.: PCT/DE2017/000224
§ 371 (c)(1),
(2) Date: Mar. 25, 2019

(87) PCT Pub. No.: WO2018/054404
PCT Pub. Date: Mar. 29, 2018

(65) Prior Publication Data
US 2019/0219383 A1    Jul. 18, 2019

(30) Foreign Application Priority Data
Sep. 26, 2016   (DE) ........................ 10 2016 011 610

(51) Int. Cl.
*G01B 11/16* (2006.01)
*G01L 1/24* (2006.01)
*G02B 6/02* (2006.01)

(52) U.S. Cl.
CPC .............. *G01B 11/18* (2013.01); *G01L 1/246* (2013.01); *G02B 6/02209* (2013.01)

(58) Field of Classification Search
CPC ...... G01B 11/18; G02B 6/02209; G01L 1/246
See application file for complete search history.

(56) References Cited

U.S. PATENT DOCUMENTS

| 7,703,331 B2* | 4/2010 | Magne | E21B 43/01 73/766 |
| 9,857,250 B2* | 1/2018 | Wakahara | G01B 11/18 |

(Continued)

FOREIGN PATENT DOCUMENTS

| DE | 26 58 324 | 6/1978 |
| EP | 1 148 324 | 10/2001 |

(Continued)

OTHER PUBLICATIONS

International Search Report dated Nov. 29, 2017 by the European Patent Office in International Application PCT/DE2017/000224.

*Primary Examiner* — Freddie Kirkland, III
(74) *Attorney, Agent, or Firm* — Henry M. Feiereisen LLC

(57) ABSTRACT

A weldable strain sensor includes a strain sensor having two end portions in signal communication with signal lines for transmitting a measurement signal. A sensor carrier extends in a direction of the strain sensor and is firmly connected to the strain sensor. The sensor carrier includes two end portions having slots to thereby form tongues defining tongue ends which are directed in opposition to each other. Integrally surrounding the strain sensor and the end portions thereof is a protective cover of solid plastic which is firmly connected to the sensor carrier. The protective cover is configured in a region of the strain sensor narrow and flat and in a region of coupling points of the strain sensor with (Continued)

the signal lines at least twice as wide and at least twice as high as in a region of the strain sensor.

8 Claims, 7 Drawing Sheets

(56) References Cited

U.S. PATENT DOCUMENTS

| | | | | |
|---|---|---|---|---|
| 10,132,700 | B2* | 11/2018 | Maul | G01B 11/18 |
| 2002/0092976 | A1* | 7/2002 | Sugai | G01L 1/246 |
| | | | | 250/227.14 |
| 2003/0066356 | A1 | 4/2003 | Kanellopoulos et al. | |
| 2007/0284112 | A1* | 12/2007 | Magne | E21B 43/01 |
| | | | | 166/336 |

FOREIGN PATENT DOCUMENTS

| | | |
|---|---|---|
| JP | 2000-028329 | 1/2000 |
| JP | 2003-90772 | 3/2003 |
| JP | 4519703 | 5/2010 |
| JP | 5478778 | 10/2013 |

\* cited by examiner

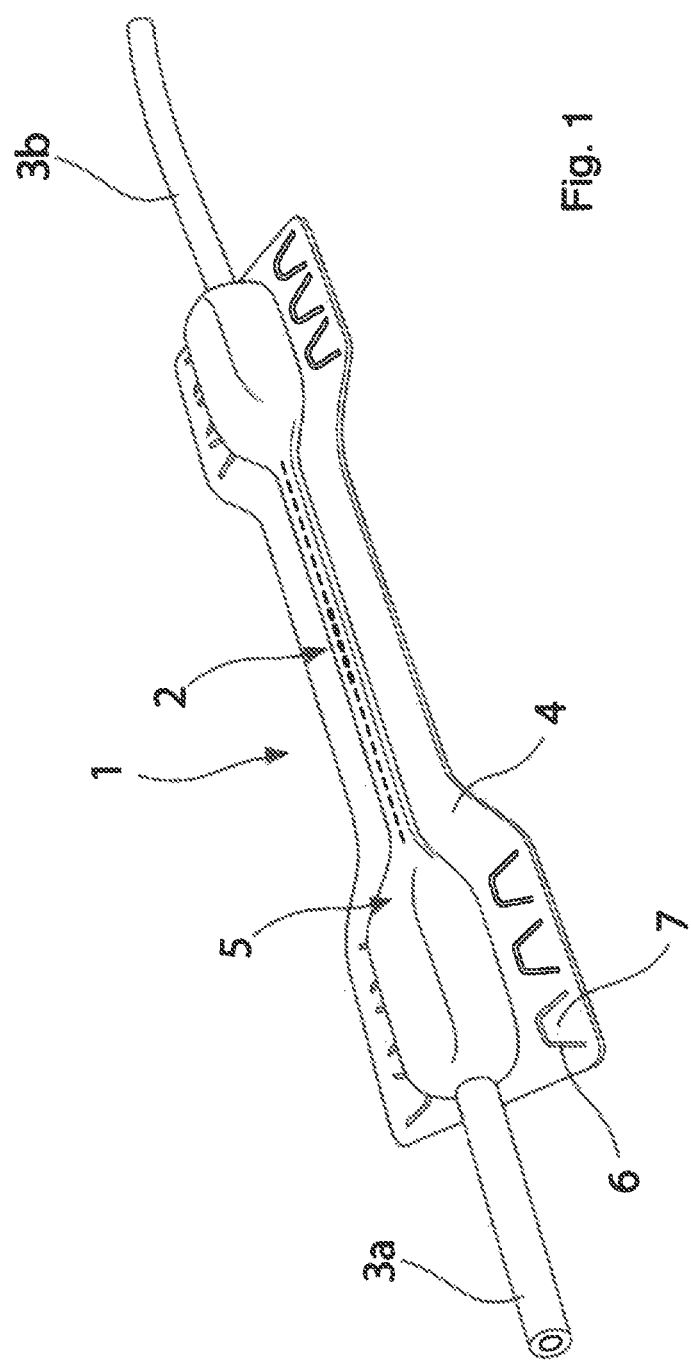

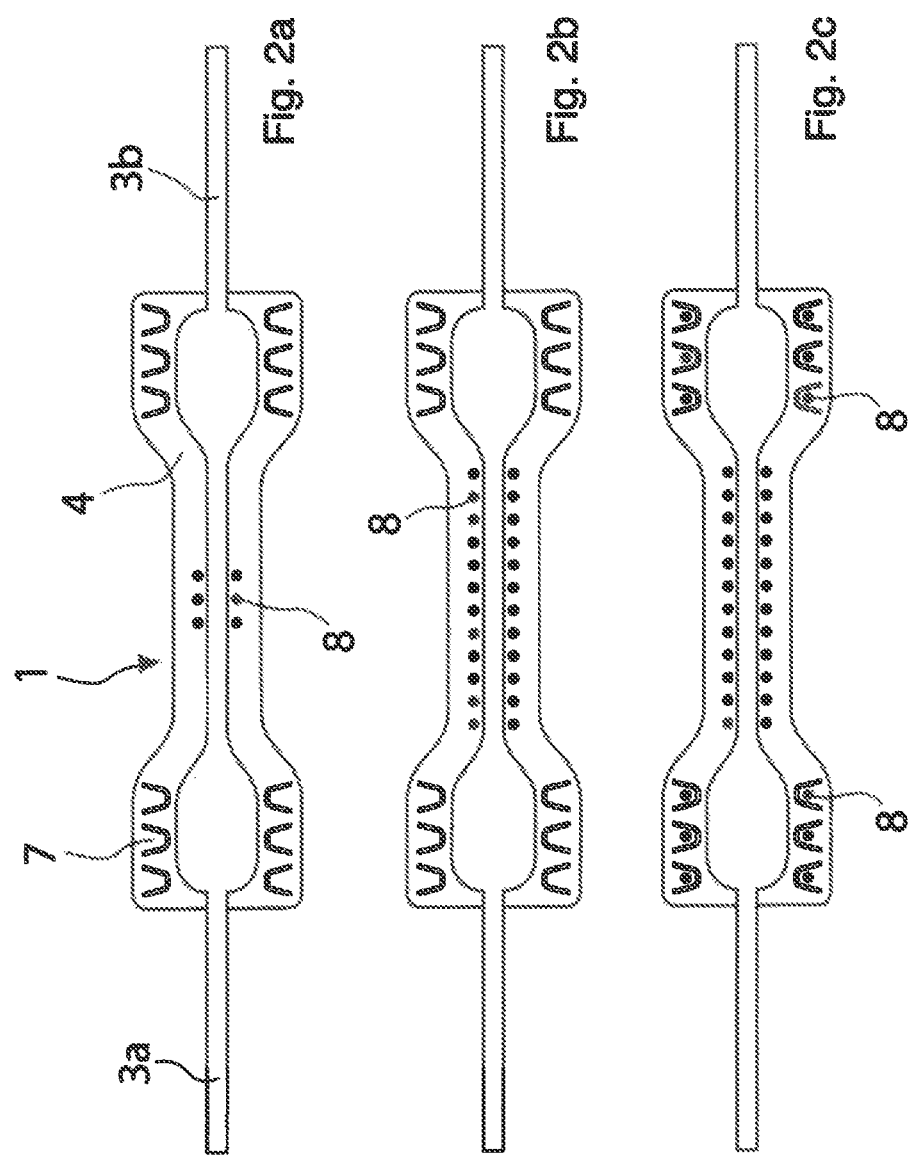

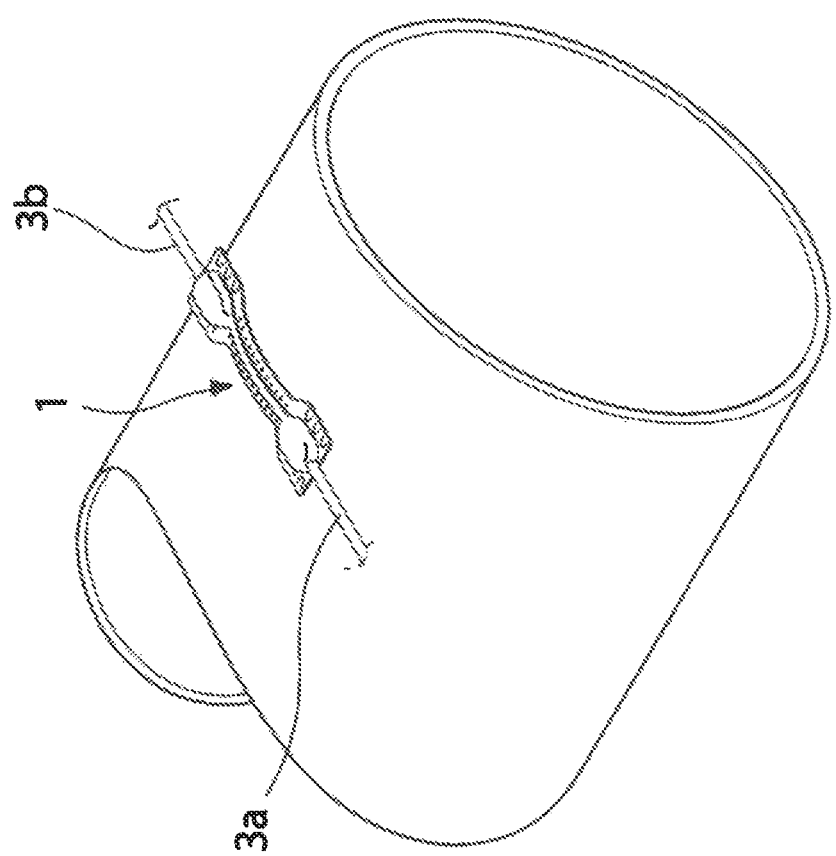

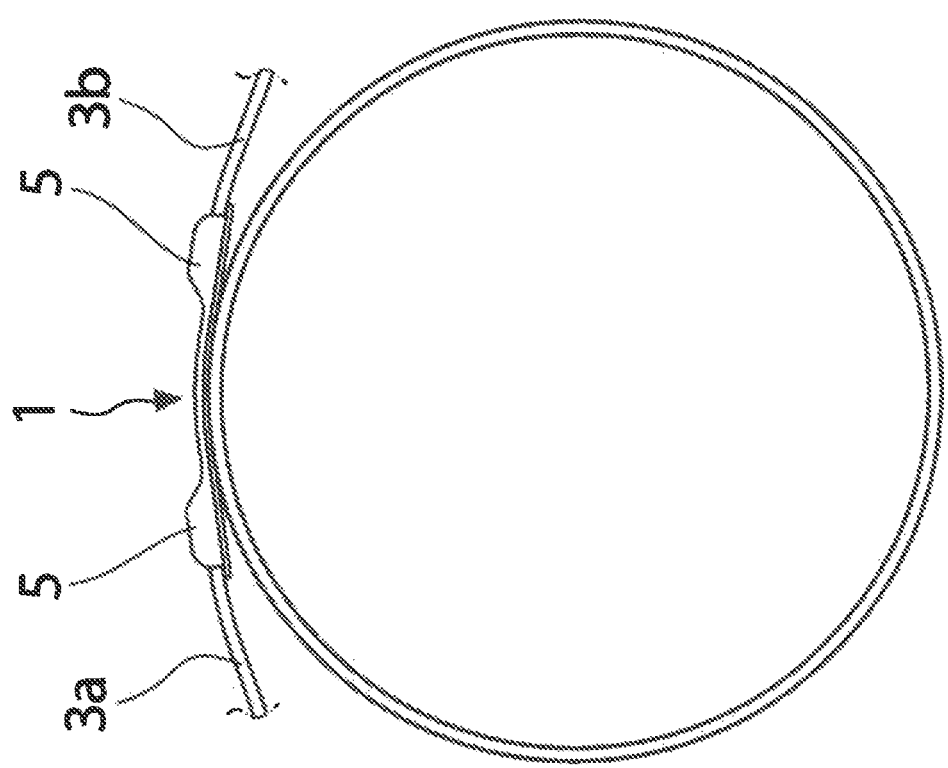

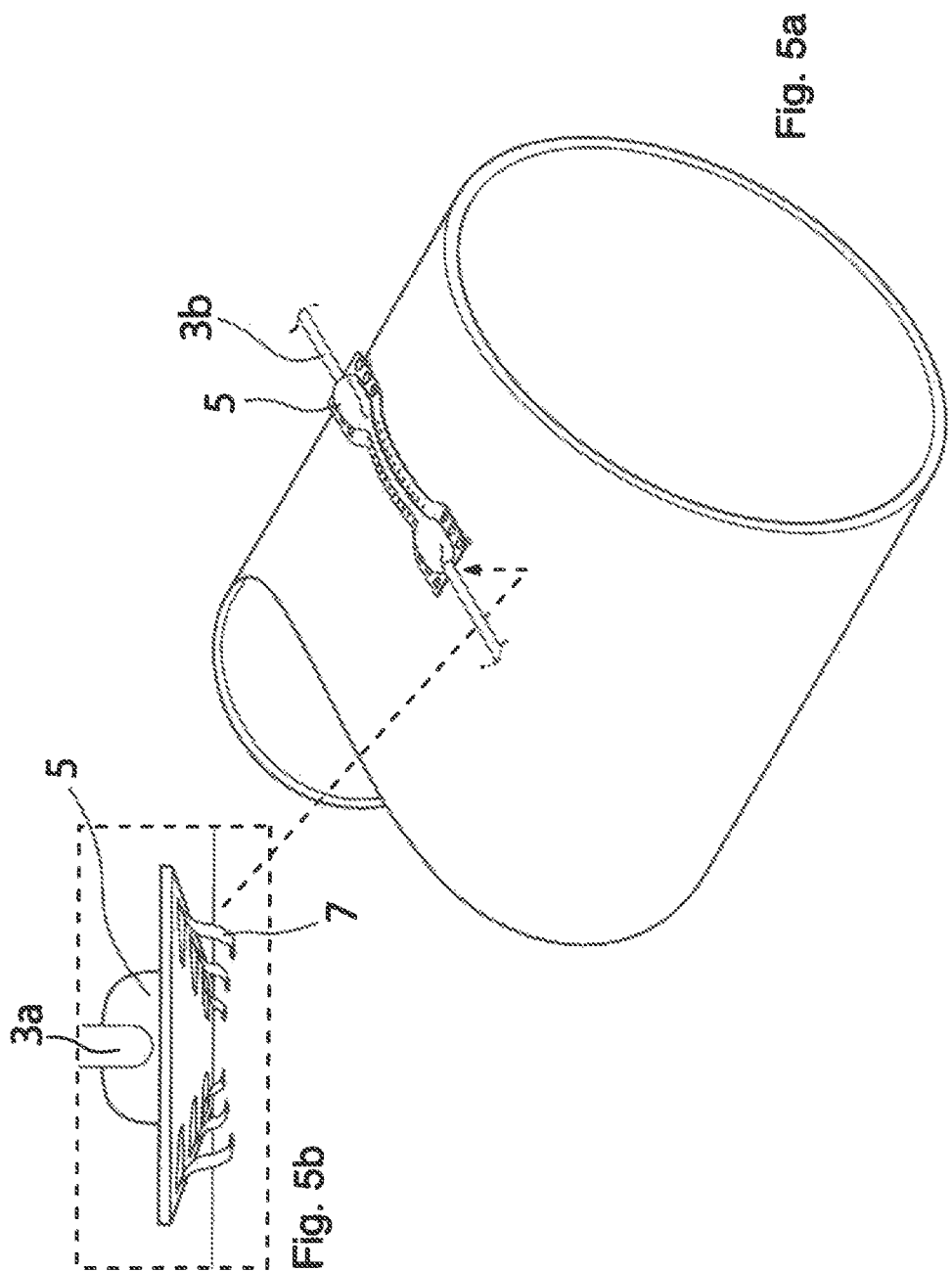

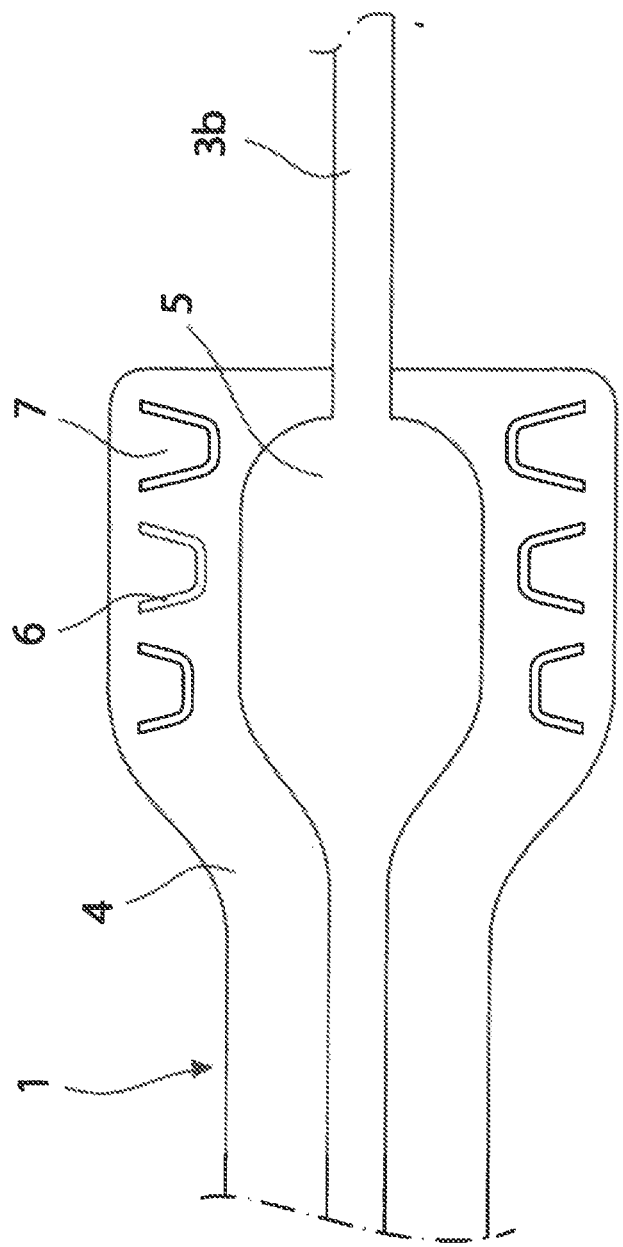

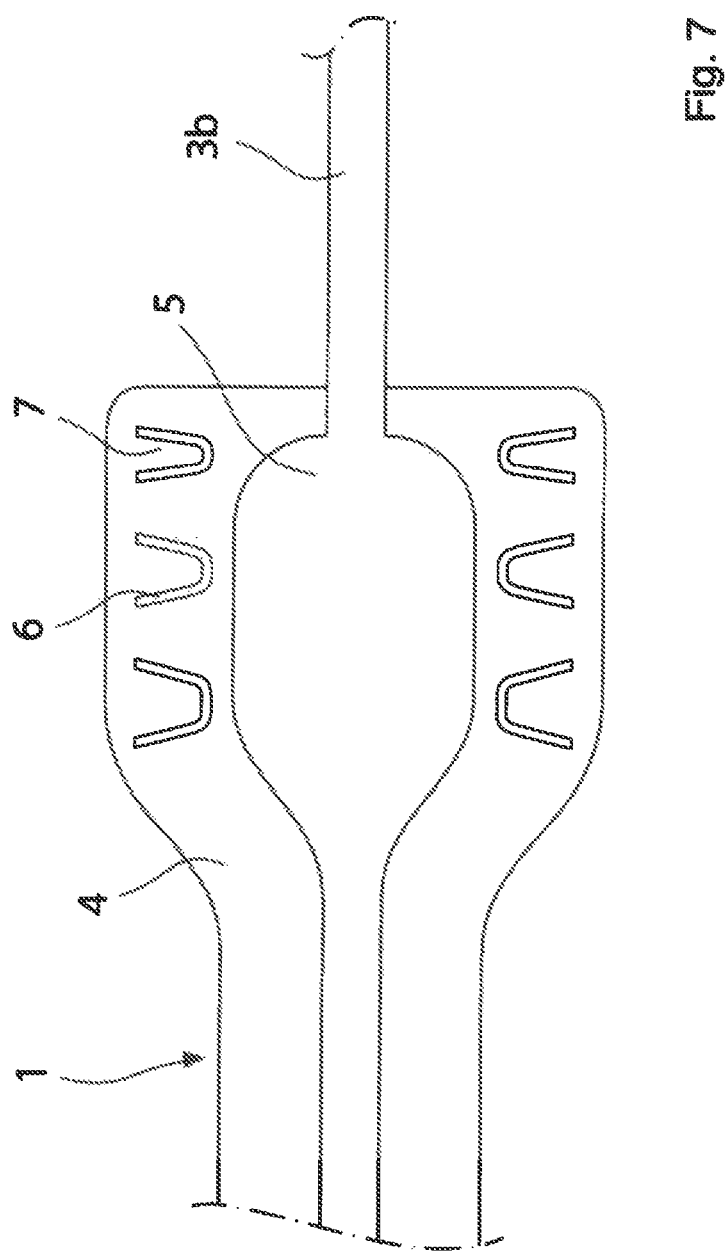

WELDABLE STRAIN SENSOR FOR CURVED SURFACES

CROSS-REFERENCES TO RELATED APPLICATIONS

This application is the U.S. National Stage of International Application No. PCT/DE2017/000224, filed Jul. 24, 2017, which designated the United States and has been published as International Publication No. WO 2018/054404 and which claims the priority of German Patent Application, Serial No. 10 2016 011 610.2, filed Sep. 26, 2016, pursuant to 35 U.S.C. 119(a)-(d).

BACKGROUND OF THE INVENTION

The invention relates to a weldable strain sensor and more particularly to a weldable strain sensor suitable for curved surfaces.

Strains of material surfaces can, e.g., be measured with strain sensors, which are mounted on these surfaces. As the surface is stretched or compressed, the strain sensors are also impacted, so that a measurement signal is generated.

Weldable strain sensors are known from the prior art. For this purpose, the documents DE 2658324 C2, JP 2003090772 A, JP 4519703 B2 and JP 5378778 B2 are mentioned as examples.

In most cases, so-called strain gauges are used as strain sensors, which are fastened by means of an adhesive. Adhesives can easily be processed, but have also properties that can be detrimental under certain environmental conditions. These unfavorable environmental conditions involve greatly fluctuating or high humidity and in particular large temperature differences. In addition, there is the following problem: Adhesives can be optimally processed only at so-called room temperature. When, e.g., strain sensors should be secured to steel girders of a railway bridge or to gas pipelines, this becomes then basically impossible, when the ambient temperature is below 0 degree Celsius for example. In principle, it is also not possible to heat the measuring point, because this causes temperature-induced material expansions which would greatly falsify the measured values in this area.

Strain gauge strips include essentially a carrier material and the strain sensor itself. The strain sensor is firmly connected to the carrier material. Carrier materials that are attached by means of adhesives are usually thin and therefore very flexible plastic films. Weldable carrier materials are usually steel sheets which are fastened by spot-welded joints on the surface to be examined.

An important difference between bondable strain gauges and weldable strain sensors is the number of work steps in the so-called application. The application of strain sensors must be carried out by specialists, because even a single improperly executed work step can lead to a short or medium-term failure of the measuring point. Hard to reach measuring points, such as railway bridges or gas pipelines, thus require considerable effort when repair of a measuring point is involved. It is known that an increase in the number of application steps also increases the error probability. When an application requires 10 work steps for example, and only one of these work steps is not executed properly, a faulty application is caused, i.e. a measuring point with impermissibly high measuring error or high failure probability. When, however, fewer steps are required for an application, the error probability thus also decreases.

In the past, application sites were usually provided with so-called protective covers for protection against moisture and mechanical damage. However, attaching these protective covers in turn increases the number of application steps and thus also the likelihood of improperly executed application steps.

It is thus desirable to provide a fastening technology with least possible error probability. Since the strain sensors are already encapsulated during manufacture, welding per se requires little effort. However, these capsules are mechanically stiff and cannot be attached to curved surfaces. A solution to the problem would be the production of encapsulated strain sensors with capsules that already have the radius of the workpiece surface to which the strain sensor is to be welded. However, for each radius of a workpiece surface, a special strain sensor must then be made. Therefore, this technique has not prevailed in practice.

SUMMARY OF THE INVENTION

The object of providing a strain sensor with a reliable fastening technology and lowest possible error probability, which is also applicable to curved surfaces, is achieved with a weldable strain sensor with the following features:

a. a strain sensor with two end portions, which are coupled in signal communication with signal lines for conducting the measurement signal, b. a sensor carrier which extends hi the direction of the strain sensor and is firmly connected thereto, with the sensor carrier being a metal sheet which can be secured by spot welding, c. a protective cover which is made of solid plastic and integrally surrounds the strain sensor and the connections to the signal ones and which is firmly connected to the sensor carrier. In the area of the sensor, the protective cover is sufficiently narrow and flat so that it does not break when mounting the sensor carrier on a curved surface. In the area of the coupling points of the signal lines, i.e. at the points where the signal lines are connected to the strain sensor, the protective cover is at least Mice as wide and at least twice as high as in the region of the sensor.

d. The two end portions of the sensor carrier, which are not surrounded by solid plastic, have slots on both sides so as to form tongues. The ends of the tongues that are arranged in pairs are directed in opposition to each other.

The function of the tongues is explained hereinafter:
The cover is narrow and flat and thus flexible only in the sensor area. It is thus possible to fasten this section of the sensor carrier to a curved surface of a tube of which the elongation is to be measured, without breakage of the cover at this point or impact on the strain sensor and thereby falsifying the measurement result. In the sensor area, the cover can be designed narrow and flat because the strain sensor itself is thin. Conversely, comparatively thick connection lines are fastened at the two ends of the strain sensor. In order for the cover of the strain sensor to also provide a robust protection, e.g. against snow and ice, it is made of a solid plastic. Therefore, the cover in the area of the connecting line is much bulkier and thus much more rigid than that of the strain sensor. It is imperative that these rigid end portions of the sensor carrier can be securely attached to the curved surface, requiring as little additional work steps as possible. This objective is attained with the aid of the tongues, because when setting the welding points in the area of the tongue ends, the tongues bend toward the surface. These tongues are pressed by the welding electrode onto the curved surface and connected thereto at the tongue end by spot welding. Thus, a secure attachment without significant additional effort is possible, i.e. there is need for only a few additional welding points.

Depending on the requirement of the strength of the welded joint and depending on the surface shape, the tongues may have different sizes and shapes.

According to another, feature, of the invention, preferably two to five pairs of tongues are respectively arranged in the two end portions of the sensor carrier, with the tongue ends of each pair of tongues lying opposite each other. This symmetrical embodiment is particularly suitable for tubes.

In a further configuration of the invention, the tongues have different lengths, with the tongue length decreasing in the direction of the strain sensor. According to another feature of the invention the invention the tongues have different widths, with the tongue width increasing in the direction of the strain sensor.

This has the following advantage: Setting the welding points is realized using a spot welder, which is only guided by hand. The welding point is placed only in an area between the tongue end and the middle of the tongue, so that a greatest possible spring travel, determined by the length of the tongue, is available. By forming tongues of different lengths or widths, the spring force of the bent tongue can be kept approximately of same size despite different deformations.

According to another feature of the invention, the strain sensor is an FBG strain sensor. The invention is particularly suitable for an optical strain sensor with a Bragg grating.

It is clear to the person skilled in the art that depending on the spatial conditions determined by the location of the measuring point, the sensor carrier can have different shapes, likewise the shapes of the tongues within a sensor carrier can vary. Decisive for the implementation of the technical teaching of the invention is a configuration of the tongues that enables an attachment of the rigid end portions of the cover at all times in the region of the signal lines, without the need for inadmissibly high pressure forces during welding.

BRIEF DESCRIPTION OF THE DRAWING

The invention will be explained in more detail below with reference to schematic drawings:

FIG. 1 shows a perspective view of a weldable strain sensor.

FIG. 2a-2c show plan views of the strain sensor with welding points.

FIG. 3 shows a perspective view of a strain sensor partially welded onto a tube.

FIG. 4 shows the front view of the strain sensor of FIG. 3 partially welded onto the tube.

FIG. 5a shows a perspective view of the strain sensor fully welded onto a tube.

FIG. 5b shows an enlarged view of differently deflected tongues mounted on the tube.

FIG. 6 shows tongues of different lengths.

FIG. 7 shows tongues of different widths.

LIST OF REFERENCE SIGNS

1—weldable strain sensor
2—FBG strain sensor
3a, 3b—signal lines
4—sensor carrier
5—protective cover
6—slots
7—tongues
8 welding points

DETAILED DESCRIPTION OF PREFERRED EMBODIMENTS

FIG. 1 shows a perspective view of a strain sensor 1 weldable onto curved surfaces. An FBG strain sensor 2 (concealed) is mechanically firmly connected and coupled in signal communication at its two end portions with signal lines 3a, 3b for conduction of the measurement signal. The FBG strain sensor 2 is bonded onto a sensor carrier 4 made of a sheet steel. The steel sheet in this exemplary embodiment has a thickness of 0.1 mm and a tensile strength of 884 N/mm$^2$.

The FBG strain sensor 2 and the signal lines 3a, 3b coupled thereto are completely covered by a protective cover 5 made of a solid plastic. In the present exemplary embodiment, epoxy resin is used because it is particularly strong and resistant to aging. The protective cover 5 is firmly connected to the sensor carrier 4. In the area of the FBG sensor 2, the protective cover 5 is narrow and flat, so as to be substantially as flexible as the thin sheet steel of the sensor carrier 4. The width of the protective cover 5 in the present embodiment is 2 mm in the area of the FBG strain sensor and the thickness is 0.5 mm. This ensures that when the sensor carrier 4 is welded onto a curved surface, the relatively hard protective cover 5 does not break. Likewise, the sensor carrier 4 is also narrower in this area than at the end portions thereof. In the present exemplary embodiment, the width of the end portions of the sensor carrier 4 is 23 mm and the portion there between is 11 mm wide.

In the region of the coupling points, i.e. where the signal ones 3a, 3b are connected mechanically and in signal communication with the end portions of the FBG sensor 2, the protective cover 5 is at least twice as wide and at least three times as high as in the region of the strain sensor 2. In the present exemplary embodiment, the protective cover 5 in these areas is 10 mm wide, 18 mm long and 5 mm high.

The free surfaces of the end portions of the sensor carrier 4 have slots 6 so as to form tongues 7 with ends that oppose one another.

FIGS. 2a-2c show top views of the strain sensor and the sequence when setting welding spots 8. FIGS. 2a and 2b show that the welding spots 8 are set outwards starting from the middle of the sensor. Subsequently, the tongues 7 are welded, which also is implemented from the inside to the outside.

FIG. 3 shows a perspective view of a strain sensor 2 partially welded onto a tube as shown in FIG. 2b. The tongues 7 are not yet welded.

As is apparent from FIG. 4, the thick and thus very rigid end portions of the strain sensor 1 and the covers 5 as well as the signal lines 3a, 3b do not follow the curvature of the tube.

FIG. 5a shows a completely welded-on strain sensor 1. FIG. 5b shows an enlarged view of the function of the tongues 7. It is apparent that the tongues 7 are differently deflected after their attachment to the tube surface.

These tongues thus allow attachment of the entire strain sensor in a single work step. Consequently, no separate attachment technology is required for securing the thick and rigid end portions of the strain sensor 1. Since the plastic used for the cover of the class of epoxy resins is very resistant to various weather impacts, the need for an additional cover of the strain sensor is eliminated, so that the number of application steps is also reduced.

FIG. 6 shows tongues 7 of different lengths, with the longest tongues located at the sensor end, since there the distance to the tube surface is the greatest.

FIG. 7 shows tongues 7 of different width, with the narrowest tongues located at the sensor end, since there the distance to the tube surface is the greatest and the deformation forces can be kept small by a narrow tongue.

By tongues of different length or different width in each end portion of the sensor carrier, the contact pressure required for spot welding can be kept approximately constant.

What is claimed is:

1. A weldable strain sensor, comprising:
   a strain sensor having two end portions coupled in signal communication with signal lines for transmitting a measurement signal,
   a sensor carrier extending in a direction of the strain sensor and firmly connected to the strain sensor, said sensor carrier including two end portions having slots to thereby form tongues defining tongue ends which are directed in opposition to each other; and
   a protective cover made of a solid plastic and integrally surrounding the strain sensor and the end portions thereof, said protective cover being firmly connected to the sensor carrier, said protective cover being configured in a region of the strain sensor narrow and flat and in a region of coupling points of the strain sensor with the signal lines at least twice as wide and at least twice as high as in a region of the strain sensor.

2. The weldable strain sensor of claim 1, wherein the tongues are trapezoidal.

3. The weldable strain sensor of claim 1, wherein the tongues are rectangular.

4. The weldable strain sensor of claim 1, wherein the tongues are semicircular.

5. The weldable strain sensor of claim 1, wherein each of the end portions of the sensor carrier has on both sides thereof 2 to 5 tongues, which oppose each other in pairs.

6. The weldable strain sensor of claim 1, wherein the tongues vary in length, with the tongue length decreasing in a direction of the strain sensor.

7. The weldable strain sensor of claim 1, wherein the tongues vary in width, with the tongue width increasing in a direction of the strain sensor.

8. The weldable strain sensor of claim 1, wherein the strain sensor is a glass or plastic fiber having a Bragg grating.

\* \* \* \* \*